(12) United States Patent
Omdahl

(10) Patent No.: US 12,012,928 B2
(45) Date of Patent: Jun. 18, 2024

(54) HURRICANE VERTICAL-AXIS WIND TURBINES

(71) Applicant: Tracy Omdahl, River Vale, NJ (US)

(72) Inventor: Tracy Omdahl, River Vale, NJ (US)

( * ) Notice: Subject to any disclaimer, the term of this patent is extended or adjusted under 35 U.S.C. 154(b) by 0 days.

(21) Appl. No.: 18/134,922

(22) Filed: Apr. 14, 2023

(65) Prior Publication Data

US 2023/0374972 A1 Nov. 23, 2023

Related U.S. Application Data

(60) Provisional application No. 63/344,734, filed on May 23, 2022.

(51) Int. Cl.
*F03D 3/00* (2006.01)

(52) U.S. Cl.
CPC ........ *F03D 3/005* (2013.01); *F05B 2240/211* (2013.01)

(58) Field of Classification Search
CPC .......... F03D 3/005; F03D 3/062; F03D 3/064; F03D 3/065; F03D 3/067; F05B 2240/211; F05B 2240/215; F05B 2240/216; F05B 2240/218
See application file for complete search history.

(56) References Cited

U.S. PATENT DOCUMENTS

| | | | | |
|---|---|---|---|---|
| 1,352,952 A | * | 9/1920 | Gracey | F03D 3/067 416/118 |
| 1,581,537 A | * | 4/1926 | Hennigh | F03D 3/067 416/117 |
| 2004/0164561 A1 | * | 8/2004 | Nagawa | F03D 3/067 290/55 |
| 2005/0082838 A1 | * | 4/2005 | Collins | F03D 3/067 290/55 |
| 2007/0296216 A1 | * | 12/2007 | Liao | F03D 3/062 290/52 |
| 2008/0181777 A1 | * | 7/2008 | Bailey | F03D 3/067 416/131 |
| 2013/0091861 A1 | * | 4/2013 | Groot | F01D 5/02 416/119 |
| 2023/0374972 A1 | * | 11/2023 | Omdahl | F03D 3/009 |

FOREIGN PATENT DOCUMENTS

| | | | | |
|---|---|---|---|---|
| KR | 20140112922 A | * | 3/2013 | |
| WO | WO-2007105985 A1 | * | 9/2007 | F03D 3/005 |
| WO | WO-2010093280 A1 | * | 8/2010 | F03D 3/067 |

\* cited by examiner

*Primary Examiner* — Christopher R Legendre
(74) *Attorney, Agent, or Firm* — NYLS Patent Law Clinic

(57) ABSTRACT

A vertical-axis wind turbine. The vertical-axis wind turbine comprises a central rotatable hub having multiple wingspars to mount multiple airfoils, a pushrod firmly and rigidly positioned via each wingspar to convert a linear kinetic wind energy from the airfoils to the pushrods to the rotational energy of the central rotatable hub, and an axle attached to the central rotatable hub. The vertical-axis wind turbine rotates the multiple airfoils configured with two airfoils per wingspar, wherein at least two airfoils are mounted on each wingspar. The airfoils work when they are blown upon by applying fluid force to the pushrod and wingspar, one airfoil is blown and held into the maximum angle of attack to perform work to be pushed by the wind, and its opposite is blown and held into the minimum angle of attack to pull back in the wind.

16 Claims, 14 Drawing Sheets

HURRICANE VERTICAL-AXIS WIND TURBINES

BACKGROUND OF THE INVENTION

A wind turbine is a device that converts the kinetic energy of wind into electrical energy using the aerodynamic force from the rotor airfoils, which work like an airplane wing or helicopter rotor blade. Currently, the known standard for the wind power generator is a propeller design with a directional mechanism to keep it facing the wind. This is often referred to as an ERDA-NASA design. Over time, numerous disadvantages of this design have emerged which imply that this design may not be the best way to meet the challenge of a rapidly accelerating demand for electrical power.

One major drawback is the expense to install and maintain the propellers. It is estimated that in order to generate enough power for a single residential dwelling, a propeller of at least 25 feet in diameter may be required. Other estimates suggest that very large diameter designs, from 125 to 200 feet, may be needed to achieve outputs in the 100 kilowatts-1000 kilowatts range. The cost of these machines increases rapidly with size, production, installation, and maintenance. These machines are also prone to higher stresses given they are large, heavy units. This would make replacing the entire unit more likely. Additionally, efficiently utilizing wind power by an ERDA-NASA unit requires many control mechanisms for turning the unit; feathering its airfoils, and overspeed braking in high winds. These control mechanisms use energy to operate, thus decreasing efficiency and further complicating design and production/maintenance costs.

Safety is another major concern while using the propellers. The higher tip speeds of propellers and greater strains and stresses on the materials used to make them all contribute to metal fatigue, which then increases the risk of catastrophic failures. Additionally, there are already numerous concerns about the massive effects on wildlife, especially birds and migratory animals. ERDA-NASA units located near dwellings, or on the tops of tall buildings, also pose potentially serious hazards to human and animal life as well as to property.

Current models of the ERDA-NASA wind turbines do not utilize wind energy efficiently over a wind range or changing wind speeds. The turbines typically operate at a preferred constant wind speed of 40 rpm in a range between 6 and 60 mph. The airfoils are feathered to prevent damage in high winds. However, while the feathered airfoils are needed to prevent damage, they are simultaneously resulting in high energy losses at speeds in excess of 18 mph, because the propeller airfoils feather in an effort to maintain a preferred constant rotation at 40 RPM. In addition, there are also significant energy losses at wind speeds less than 18 mph because generator changes (changes in load) must be made to keep that constant 40 rpm rotation. The lack of wide wind-speed range results in inconsistent efficiency. As wind speeds heavily fluctuate, having a narrow window of optimal wind velocities decreases efficiency.

The direction of wind current is itself in constant change and unpredictable, especially in a small region over periods of great turbulence. Efficient wind turbines must be able to rapidly adjust to sudden directional changes over a full range, i.e., 360 degrees. Today's ERDA-NASA is unable to exhibit quick responsiveness to the directional changes in the wind and must gradually reposition to take account of directional fluctuations.

Due to the necessary element of size, the current ERDA-NASA turbines cannot accommodate smaller scale locations, such as cars and residential homes. Since there is a lack of space, accompanied by low energy outputs, ERDA-NASA turbines are applicable to small-scale uses.

To avoid the above-mentioned drawbacks, vertical-axis wind turbines are introduced. These turbines have airfoils, vanes or blades displayed outward from a vertically mounted, central axis, opposite to the horizontal axis of rotation for ERDA-NASA generators. An example of vertical-axis wind turbine is seen on many home rooftops to improve attic air circulation. The first advantage of such devices is that they do not need to be rotated to always face the wind. Whatever direction the wind comes from, these devices can immediately absorb wind energy and convert it to rotational power. Such devices are sometimes technically described as having their axis of rotation transverse to the flow of the fluid medium. There are two main categories of Vertical Axis Wind Turbines, referred to as Darrieus-type wind turbines, and Savonius-type wind turbines.

Darrieus-type wind turbine is based on the original Darrieus device as disclosed in the prior art U.S. Pat. No. 1,835,018. A traditional Darrieus rotor is essentially two or more long thin airfoils with their ends connected at the top and bottom to a vertically rotating shaft. The cross-section of long blades has an airfoil shape, and this aerodynamic feature provides the transformation of wind flow energy into rotational energy.

However, one of the biggest downfalls of Darrieus-type wind turbine, especially those closely based on the original, is not self-starting. They require an auxiliary power source to reach operational speeds. Darrieus turbines have an outside rotor speed of 4 to 6 times the wind speed. For example, in winds of 25 mph, the exposed knife blade-like rotors will be traveling in excess of 100 mph. This type of situation is extremely far from being wildlife-friendly and poses extreme hazards to life and property. Also, the efficiency of the original Darrieus design has been estimated to be only 30% to 40%.

Savonius-type wind turbine as shown in U.S. Pat. No. 1,697,574, was a pair of opposing concave vanes rotating around a central vertical axis. Classic Savonius rotors are open in the center and permit crossing fluid flow in an S-shape, past the inner edges of these rotating vanes. All innovations that stem from this type of turbine share one common essential with the original Savonius patent: they all depend on the fact that wind force applied to a rigid concave surface is greater than the same or lower wind force applied to a physically connected yet opposed rigid convex surface.

However, most Savonius-type wind turbines share a major disadvantage of energy loss from drag. Drag is the resistance resulting from moving a rigid surface against the wind or fluid medium. Due to all of the vanes being surrounded by air when rotating, there is a constant drag that resists their movement even against the backs of downwind vanes moving away from the wind. When vanes are moving upwind and presenting their rear surface to the wind, the effect of drag is amplified by the added applied force of the wind. The existence of drag considerably reduces the efficiency of this type of wind generator. Even though there have been improvements to this type of turbine, the additional costs and energy outputs required to combat the issue of drag lead to a decrease in overall efficiency, even if the drag is recognized and lessened. Also, the rotating vanes require minimal clearance between the edges of their stationary wind deflecting panels and vanes, creating an intense cutting effect. From the perspective of a bird, this would equate to someone making a large bird grinder to fly through.

Henceforth, there is a need for a cost-effective, compact and smaller sized turbine that also does not pose a threat to wildlife. There is also a need for a fluid turbine able to capture fluid energy more efficiently than a Savonius-type wind turbine, combined with the capability to automatically move perpendicularly and freely with the wind and gusts without requiring a starting velocity. In addition, there is a need for a cost-effective, aesthetically pleasing, up-sizable turbine made from commonplace commercially available parts.

SUMMARY OF THE INVENTION

The present disclosure relates to a wind turbine. The wind turbine is configured to capture low ground wind energy through a vertical axis panemone turbine. The vertical axis wind turbine has the ability to capture the wind energy effectively, and move freely in perpendicular direction with the wind in a more efficient manner. The vertical axis wind turbine automatically moves perpendicularly and freely with the wind and gusts without requiring a starting velocity.

In one embodiment, the vertical-axis wind turbine comprises a central rotatable hub. The central rotatable hub comprises multiple wingspars configured to mount multiple airfoils. In one embodiment, the vertical-axis wind turbine further comprises one or more pushrods firmly and rigidly positioned via each wingspar configured to convert a linear kinetic wind energy from the airfoils to the pushrods to the rotational energy of the central rotatable hub. In one embodiment, the vertical-axis wind turbine further comprises an axle or stationary axle shaft having an upper end attached to the central rotatable hub and a lower end inserted into a base.

In one embodiment, the vertical-axis wind turbine rotates the multiple airfoils configured with two airfoils per wingspar. In one embodiment, at least two airfoils are mounted on each wingspar. In one embodiment, the airfoils work when they are blown upon by applying fluid force to the pushrod and wingspar, one airfoil is blown and held into the maximum angle of attack to perform work to be pushed by the wind, and its opposite is blown and held into the minimum angle of attack to pull back in the wind.

In one embodiment, each airfoil is mechanically joined to the airfoil at the other end of the pushrod, such that the central rotatable hub is turned in the same rotation direction irrespective of the direction of the wind. In one embodiment, the central rotatable hub holds the axle loosely and rotates freely around the axle with a minimum of friction. In one embodiment, the central rotatable hub holds the wingspars loosely and allows them to rotate freely in their wingspar holes with a minimum of friction.

In one embodiment, each wingspar is constrained by the pushrod that is parallel to it to rotate back and forth to about 90 degrees from its initial position. The wingspars rotate in both clockwise and counterclockwise directions, continuously while the airfoils are pushed, and each wingspar connects the two airfoils, each firmly fixed on opposite sides of the central rotatable hub. In one embodiment, the vertical-axis wind turbine comprises a minimum of two sets of four airfoils. The airfoils are fixed at right angles to each other on the opposite sides of the central rotatable hub.

In one embodiment, each airfoil faces the fluid for maximum available drag when it is pushed back against the pushrod by the fluid at its maximum angle of attack. The axle is rigidly anchored onto one or more structures at one or more ends. In one embodiment, the pushrod provides a surface for the airfoil to push on at its maximum angle of attack. The pushrod stops the airfoil from passing it when the airfoil experiences maximum drag. In one embodiment, the fluid force pushes the airfoil onto the pushrod and forces the hub to turn out of the direction of fluid flow until the airfoil is no longer forced onto the pushrod.

In one embodiment, at least one airfoil automatically presents a retreating face with maximum drag to the oncoming fluid during the rotation from about zero degree to about 180 degrees. The fluid withdraws the advancing airfoil from the drag from about 180 degrees to about 360 degrees of rotation when the airfoil resets itself to start the process over again. In one embodiment, at least one airfoil falls for maximum energy capture and the next airfoil in the next pair advances falling down next and taking over energy capture.

In one embodiment, the airfoil on the opposite side of the wingspar is pushed up and out of the energy captured by its wind and by its mate that has been pushed down on the other side of the hub on the same wingspar. Each pair of airfoils resets and freely hangs down from horizontal in preparation for another 90 degrees of vertical rotation. In one embodiment, the airfoil is wind-driven and is perpendicular to the wind. In one embodiment, the airfoil is parallel to the vertical axis as it is wind-driven and is restrained in the perpendicular position by the rigid pushrod pressed into the hub parallel to its rotating spoke and that pushes against to drive around the central rotatable hub.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

Figure 1:
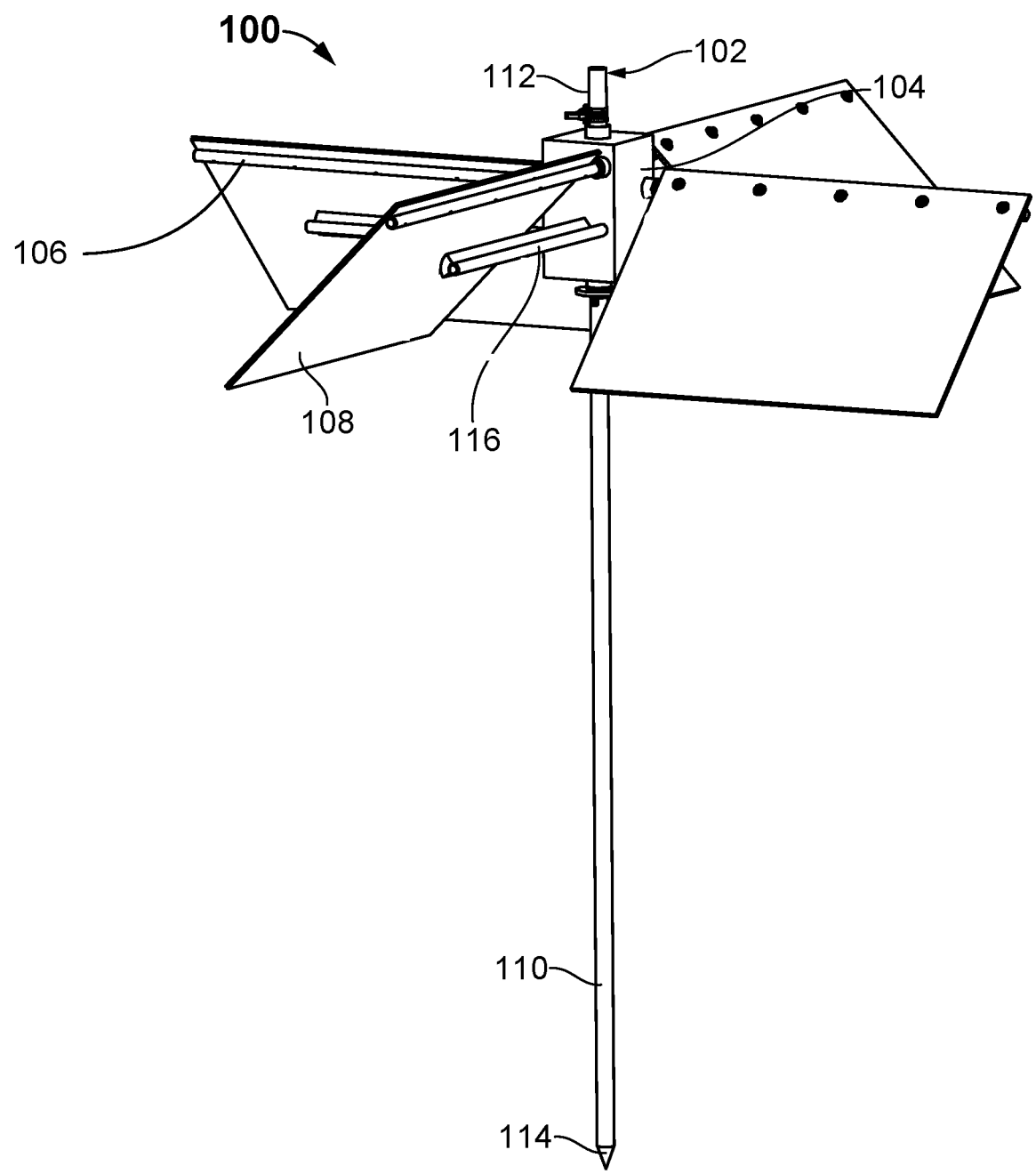
FIG. 1 exemplarily illustrates a perspective view of a vertical-axis wind turbine, according to an embodiment of the present disclosure.

The present disclosure generally relates to a wind turbine and more specifically it relates to a machine capable of capturing low ground wind energy through a vertical axis panemone turbine. The present invention has four vanes that are oriented 90 degrees apart from one another and are attached to a central rotatable hub, wherein said central rotatable hub is attached to a base. In one embodiment, there is a vertical-axis-wind turbine that rotates 4 or more airfoils configured with two airfoils per wingspar wherein two airfoils are mounted on each wingspar, two wingspars would be held at right angles and held in place by a hub, the airfoils do work when they are blown upon by pushing a pushrod, one airfoil is blown and held into the maximum angle of attack to do work, and each airfoil is mechanically joined to the airfoil at the other end of the shaft and the pushrods, therefore, turn the hub in the same rotation direction no matter what direction the wind blows.

The vertical axis wind turbine also has a hub that transfers kinetic energy from the wingspars and pushrods to rotate itself. The hub holds the axle loosely and rotates freely around the stationary axle shaft with a minimum of friction, holds the pushrods firmly and rigidly to convert the linear kinetic wind energy from the pushrods to the rotational energy of the hubs, and holds the wingspars loosely and allows them to rotate freely in their wingspar holes with a minimum of friction. In addition, the turbine has a wingspar wherein the prime function of each, in unison with the pushrods, is to transfer the kinetic energy from each airfoil to the hub. Each wingspar is constrained by the pushrod that is parallel to it to rotate 90 degrees back and forth, wherein the wingspars rotate clockwise and counterclockwise, continuously while the wings are pushed, and each wingspar connects the two wings, each on opposite sides of the hub, together into a single moving part.

The turbine also has airfoils wherein each airfoil faces the fluid for maximum available drag when it is pushed back against the pushrod by the fluid at its maximum angle of attack and an axle that is rigidly anchored onto a structure(s) at its end(s) where the axel comprises a fixed cylindrical surface for the hub to rotate on. The turbine also has a pushrod wherein each provides a surface for the airfoil to push on at its maximum angle of attack. This pushrod comprises push rods that stop the airfoil from passing it when the airfoil experiences maximum drag wherein the fluid pushes the airfoil onto the pushrod and forces the hub to turn out of the direction of fluid flow until the airfoil is no longer forced onto the pushrod.

Lastly, the turbine has airfoils fixed at right angles to each other on the opposite sides of the hub. In another embodiment, The vertical-axis-wind turbine comprises a self-correcting retreating-drag airfoil pairs that can be oriented vertically, horizontally, or upside down. Additionally, it comprises one airfoil automatically presenting a face with maximum drag to the oncoming fluid during the rotation from zero to 180 degrees wherein from 180 degrees to 360 degrees rotation, the fluid withdraws the advancing airfoil from the drag as it resets itself to start the process over again. In this embodiment there is an airfoil that falls and the next airfoil of the four in the next pair advances and takes over, being pushed up by its wind and by its mate on the other side of the hub on the same wingspar. An airfoil pair when not being dropped or lifted, resets and free hangs, each at 45° from horizontal for another 90° vertical rotation. This embodiment further comprises wherein the wind-driven airfoil is perpendicular to the wind but parallel to the vertical axis as it is wind-driven and is restrained in the perpendicular position by a rigid pushrod pressed into the hub parallel to its rotating spoke and which it pushes against to drive the hub around.

A description of embodiments of the present disclosure will now be given with reference to the figures. It is expected that the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

Before any embodiments of the invention are explained in detail, it is to be understood that the disclosure is not limited in its application to the details of construction nor to the arrangement of components set forth in the following description or illustrated in the drawings. The disclosure is capable of other embodiments and of being practiced or of being carried out in various ways.

Referring to FIG. 1, a perspective view of a vertical-axis wind turbine 100, according to one embodiment is disclosed. The vertical-axis wind turbine 100 is an innovative and intelligent solution that has been designed to effectively capture the wind energy, combined with the capability to move perpendicular and freely with the wind in a more efficient manner. In one embodiment, the vertical-axis wind turbine 100 has the ability to capture low ground wind energy.

In one embodiment, the vertical-axis wind turbine 100 comprises a main body assembly 102 having a central rotatable hub 104. The central rotatable hub 104 comprises multiple wingspars 106 configured to mount multiple airfoils 108. In one embodiment, the vertical-axis wind turbine 100 further comprises at least four airfoils 108. In one embodiment, the four airfoils 108 are oriented 90 degrees apart from one another. In one embodiment, the vertical-axis wind turbine 100 further comprises an axle or stationary axle shaft 110. The axle 110 has an upper 112 end and a lower end 114. In one embodiment, the central rotatable hub 104 is attached to the upper end 112 of the axle 110, whereas the lower end 114 is inserted into a base.

In one embodiment, the vertical-axis wind turbine 100 further comprises one or more pushrods 116. Each pushrod 116 is firmly and rigidly positioned via each wingspar 106 configured to convert a linear kinetic wind energy from the airfoils 108 to the pushrods 116 to the rotational energy of the central rotatable hub 104. In one embodiment, the vertical-axis wind turbine 100 rotates the airfoils 108 configured with two airfoils per wingspar 106. In one embodiment, at least two airfoils 108 are mounted via each wingspar 106.

In one embodiment, the airfoils 108 work when they are blown upon by applying fluid force to the pushrod 116 and wingspar 106. One airfoil 108 is blown and held into the maximum angle of attack to perform work to be pushed by the wind, and its opposite is blown and held into the minimum angle of attack to pull back in the wind. Each airfoil 108 is mechanically joined to the airfoil 108 at the other end of the pushrod 112, such that the central rotatable hub 104 is turned in the same rotation direction irrespective of the direction of the wind.

Figure 14:
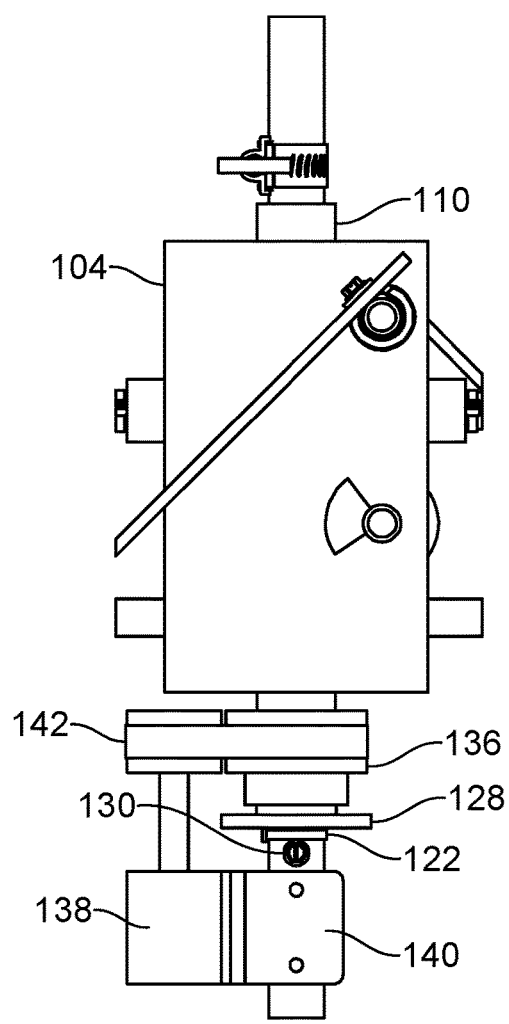
FIG. 14 exemplarily illustrates an enlarged view of the central rotatable hub with generator assembly, according to another embodiment of the present disclosure.

The central rotatable hub 104 is one of the three minimum moving parts of the turbine system. The central rotatable hub 104 is configured to rotate on a fixed length of the unmoving axle 110 at a right angle to the pushrods 116 and wingspars 106. The central rotatable hub 104 converts kinetic energy from the wingspars 106 and pushrods 116 respectively, to rotational energy to rotate itself. In one embodiment, the central rotatable hub 104 is located in a fixed location on the axle 110 and rotates freely around the axle 110 with a minimum of friction. In one embodiment, the central rotatable hub 104 holds the pushrods 116 firmly and rigidly to convert the linear kinetic airfoil energy from the pushrods 116 to the rotational energy of the central rotatable hub 104. In one embodiment, the central rotatable hub 104 holds the wingspars 106 loosely and allows them to rotate freely in their slippery wingspar holes with a minimum of friction. In one embodiment, the central rotatable hub 104 is firmly attached to a generator pulley 136 (as shown in FIG. 14) and transfers its rotation energy to a v-belt 142 (as shown in FIG. 14). In one embodiment, the central rotatable hub 104 is configured depending on user preference to hold any number of wingspars 106. Further, the central rotatable hub 104 is rated to retain a mechanical strength greater than the cycles of push stress in order to not fracture during its lifetime.

Figure 2:
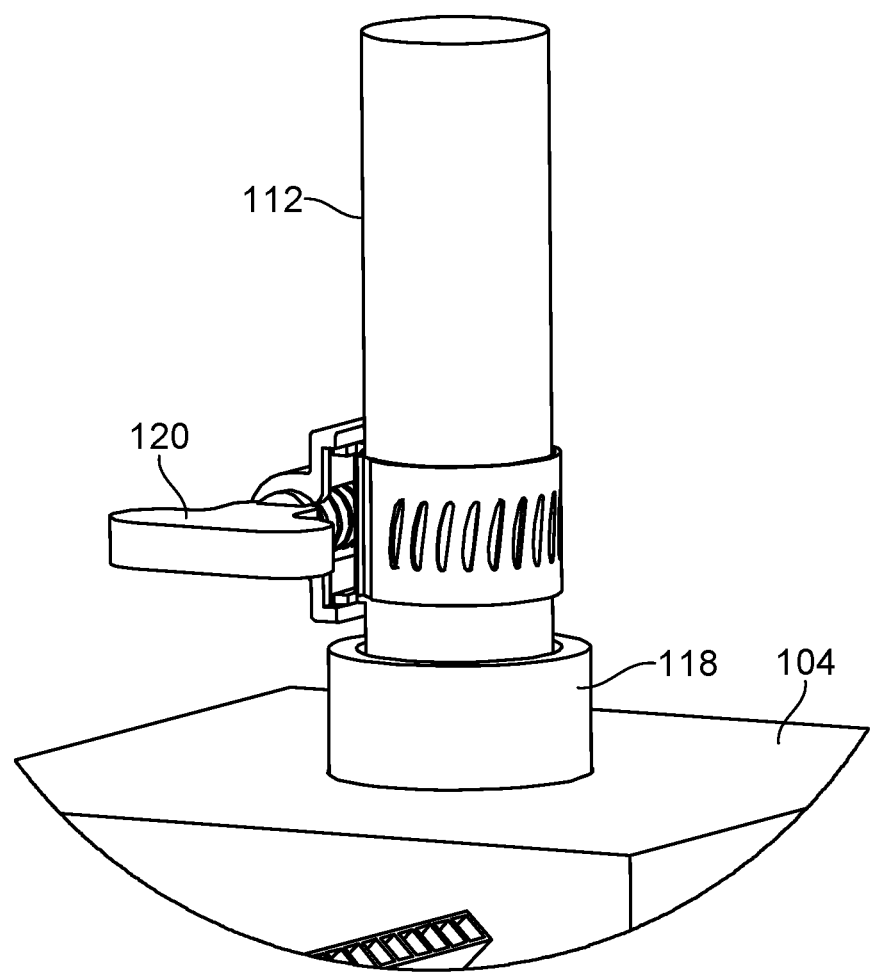
FIG. 2 exemplarily illustrates an enlarged view of an upper end of a central rotatable hub, according to an embodiment of the present disclosure.

Referring to FIG. 2, an enlarged view of an upper end of the central rotatable hub 104, according to one embodiment is disclosed. In one embodiment, the vertical-axis wind turbine 100 further comprises an axle shaft liner 118 configured to function as a slippery bearing surface between the axle 110 and the central rotatable hub 104. In one embodiment, the vertical-axis wind turbine 100 further comprises a turnkey finger-tight clamp 120. The turnkey finger-tight clamp 120 is configured to mount the central rotatable hub 104 to the axle 110. In one embodiment, the turnkey finger-tight clamp 120 is configured to manually secure the central rotatable hub 104 to the axle 110.

Figure 3:
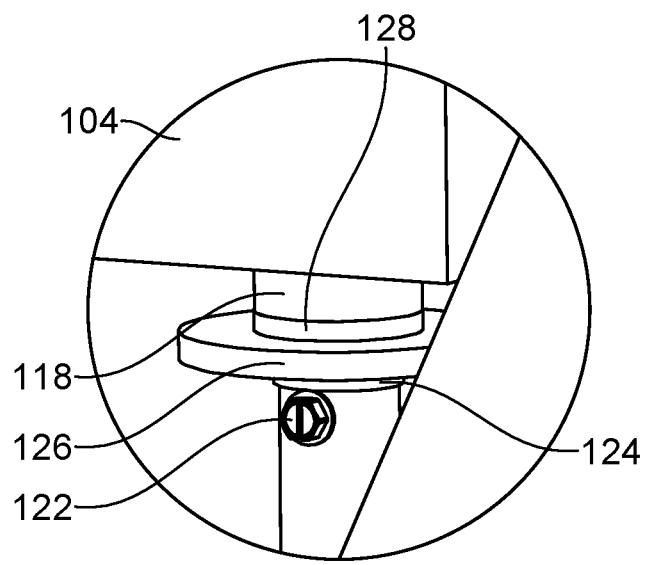
FIG. 3 exemplarily illustrates an enlarged view of a lower end of the central rotatable hub, according to an embodiment of the present disclosure.

Referring to FIG. 3, an enlarged view of a lower end of the central rotatable hub 104, according to one embodiment is disclosed. In one embodiment, the vertical-axis wind turbine 100 further comprises a flange hex head sheet metal screw or sheet metal screw 122 configured to secure a tie wrap 124. The tie wrap 124 is positioned under a flat washer or metal axle or a first flat washer 126. In one embodiment, the flat washer 126 is configured to provide a flat surface for a plastic bearing or plastic flat washer 128 to rotate upon and it holds secure the weight of the central rotatable hub 104. In one embodiment, the plastic flat washer 128 provides a flat surface or slippery bearing surface between the flat washer 126 and the central rotatable hub 104.

Figure 4:
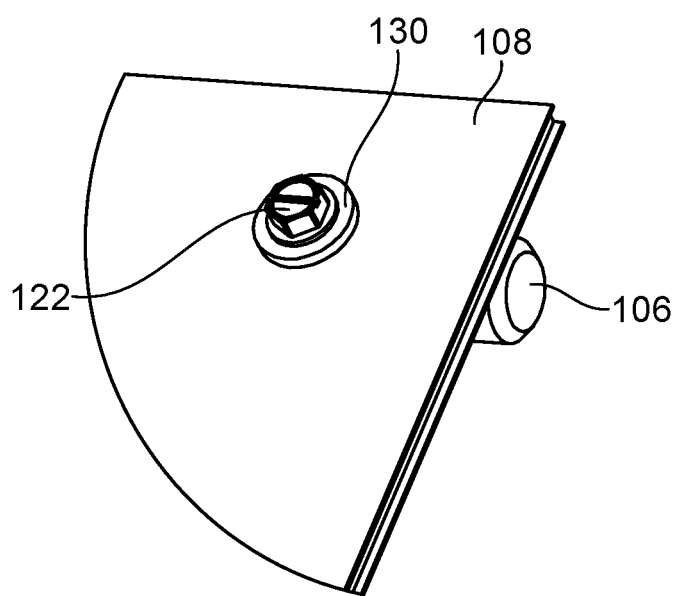
FIG. 4 exemplarily illustrates an enlarged view of an airfoil, according to an embodiment of the present disclosure.

Referring to FIG. 4, an enlarged view of the airfoil 108, according to one embodiment is disclosed. In one embodiment, the vertical-axis wind turbine 100 further comprises a second flat washer or sae flat washer 130. The second flat washer 130 is configured to secure the airfoil 108 to the wingspar 106. In one embodiment, the airfoil 108 has a dimension of about 12" in width and 18" in length.

In one embodiment, one pair of airfoils 108 are firmly attached to each wingspar 106 as a single assembly and one airfoil 108 does not move independently from its mate on the other side of the central rotatable hub 104 that is fixed to the same wingspar. There are no required shapes or sizes for the airfoils. There are a minimum of two airfoil sets or four airfoils 108 required for the turbine to function. There is no theoretical maximum to the number of pairs of airfoil assemblies than can be connected to one turbine.

During 90 degrees of its rotation around the axle 110, the airfoil 108 experiences aerodynamic drag causing it to swing into the pushrod 116 and directly into the fluid flow, which sends energy to the central rotatable hub 104 by the fluid dynamic principle of drag. Each airfoil 108 faces the oncoming fluid for maximum available drag when it is pushed back against the pushrod 116 by the fluid flowing toward the airfoil 108 at its maximum available angle of attack. At the maximum angle of attack, the flowing fluid is pushing the airfoil 108 against the pushrod 116. The airfoil 108 takes energy from the fluid when the fluid applies drag force. In one embodiment, the kinetic wind energy is transferred from the airfoil 108 to its wingspar 106 and pushrod 116 which is in turn applied by its wingspar 106 and pushrod 116 to feed the rotational energy of the central rotatable hub 104. Optionally, each airfoil 108 may function to display graphic messages on both sides.

During 90 degrees of rotation around the axle 110, each airfoil 108 is lifted out of the fluid stream into a minimum angle of attack when its mate on the same wingspar 106 pressed into the pushrod 116 at the fluids maximum angle of attack. During each 360 degrees of its rotation, the airfoil 108 is forced once into the fluid stream for maximum energy harvest and once out of the fluid stream for minimum energy loss. The airfoil 108 experiences aerodynamic lift to swing away from the pushrod 116 and out of the fluid flow into a minimum aspect ratio. When lifted, the airfoil 108 is forced out of the fluid flow by the rotation of the opposite airfoil 108 on another side of the same wingspar 106, into the fluid flow. In this way, when one airfoil 108 is forced to lift out of the stream, the opposing partner airfoil on the same wingspar 106 is forced to fall into the stream. The downstream airfoils thereby cooperate to be immersed in the fluid stream while removing their opposite upstream airfoils from the fluid stream. The airfoils roles reverse 180 degrees rotation later.

Figure 5:
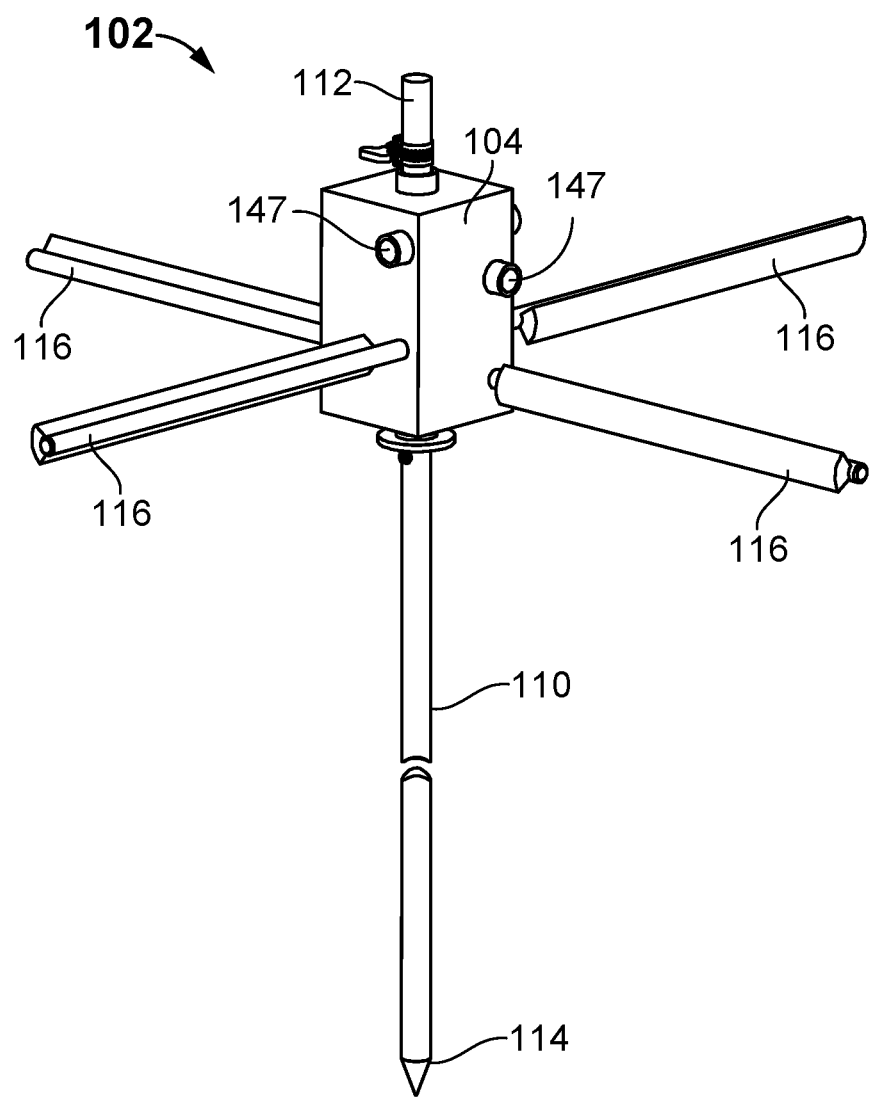
FIG. 5 exemplarily illustrates a perspective view of a main body assembly, according to one embodiment of the present disclosure.
Figure 6:
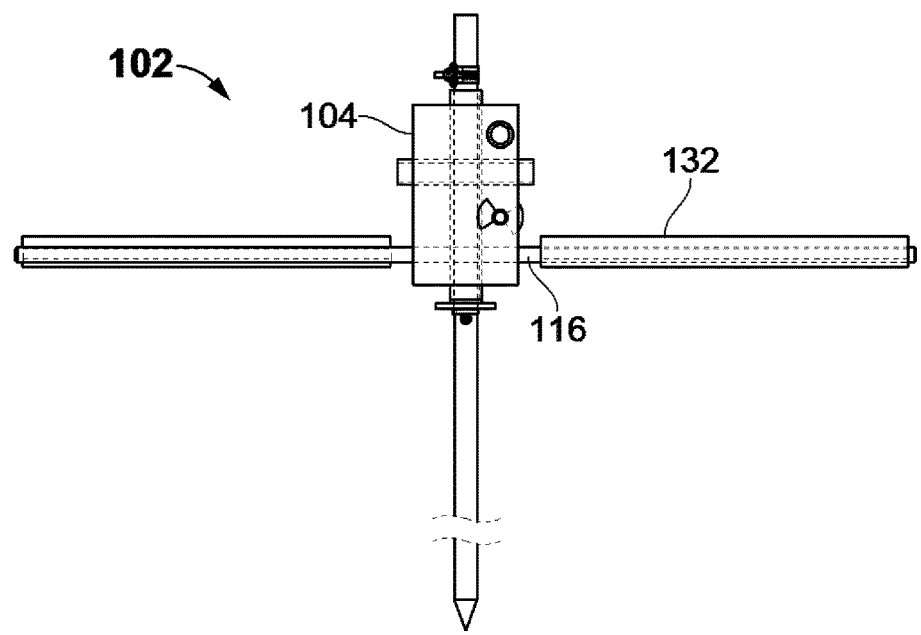
FIG. 6 exemplarily illustrates a front view of the main body assembly, according to one embodiment of the present disclosure.
Figure 7:
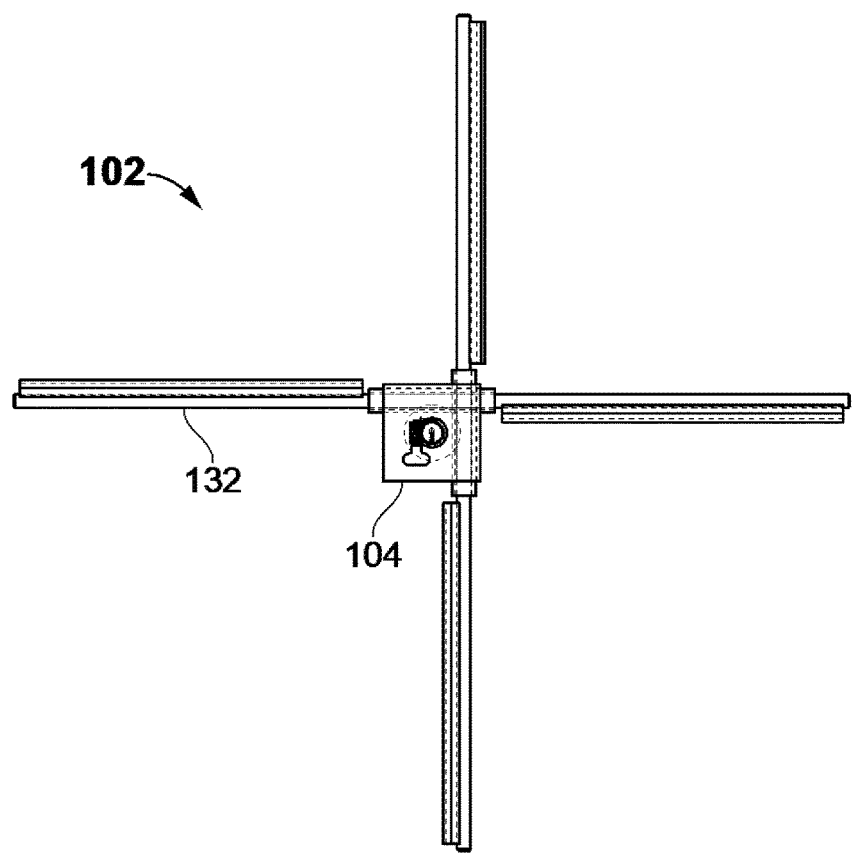
FIG. 7 exemplarily illustrates a top of the main body assembly, according to one embodiment of the present disclosure.

Referring to FIGS. 5-7, various perspective views of the main body assembly 102, according to one embodiment are disclosed. In one embodiment, the main body assembly 102 comprises the central rotatable hub 104. The central rotatable hub 104 comprises multiple wingspars 106 and one or more pushrods 116. Each pushrod 116 is firmly and rigidly positioned via each wingspar 106 configured to convert a linear kinetic wind energy from the airfoils 108 to the pushrods 116 to the rotational energy of the central rotatable hub 104. In one embodiment, the pushrods 116 are oriented 90 degrees apart from one another. Each pushrod 116 has a dimension of about 13¼" in length.

In one embodiment, a minimum of two pushrods 116 are rigidly anchored into the central rotatable hub 104 at right angles to each other. Each pushrod 116 goes through the central rotatable hub 104 sticking out an equal distance on each side of the central rotatable hub 104 and is parallel to one wingspar 106. Each pushrod 116 provides a surface for the airfoil 108 to push against at its maximum angle of attack. The prime function of each pushrod 116, in unison with the wingspar 106, is to transfer the kinetic energy from each airfoil 108 to the central rotatable hub 104. Each pushrod 116 stops the airfoil 108 from rotating past it when the airfoil 108 experiences maximum drag. The fluid flow pushes one airfoil of each pair onto the pushrod 116 and forces the central rotatable hub 104 to turn in the direction of fluid flow until the airfoil is no longer forced onto the pushrod 116.

In one embodiment, the pushrod 116 keeps each pushed airfoil 108 from swinging past it. Both sides of the pushrod 116 restrict the entire wingspar assembly to only a 90-degree freedom of rotation. Each pushrod 116 is fixed unmoving into the central rotatable hub 104 and even though it does not move in the central rotatable hub 104, the pushrod 116 moves with the central rotatable hub 104 and forms part of the moving subsystem of the central rotatable hub 104. A minimum of two pushrod sets 116 are required to enable the turbine to rotate continuously. Further, there is no theoretical upper limit to the number of wingspars 106 that can be utilized on a single axle for a single turbine.

In one embodiment, the main body assembly 102 further comprises the axle or stationary axle shaft 110 having the upper 112 end and the lower end 114. The axle 110 has a dimension of about 48" in height. In one embodiment, the central rotatable hub 104 is attached to the upper end 112, whereas the lower end 114 is inserted into the base or any support structures. In one embodiment, the main body assembly 102 further comprises a foam tape 132 positioned over the pushrod 116. The foam tape 132 is configured to reduce the noise of the airfoil 108 striking the pushrod 116. In one embodiment, the foam tape 132 may be an adhesive black vinyl foam. In one embodiment, the foam tape 132 is positioned at an angle of about 10 degrees.

The axle 110 is rigidly anchored onto a structure(s) at one or both ends. The axle 110 provides a fixed cylindrical surface for the central rotatable hub 104 to rotate on. c. An optional pump generator 138 (as shown in FIG. 14) is fixed to the axle 110. The function of the axle 110 is to remain rigidly fixed on the structure, typically the earth, resist the movement of the system and to locate the central rotatable hub 104 in a fixed location on the axle 110.

Figure 8:
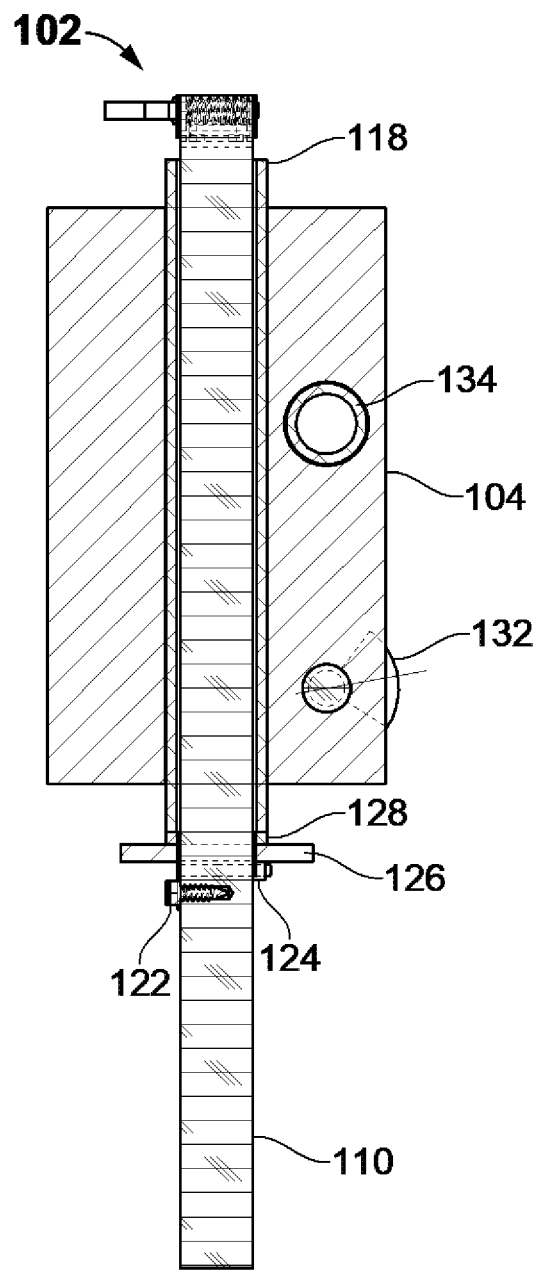
FIG. 8 exemplarily illustrates a cross-sectional view of the main body assembly, according to one embodiment of the present disclosure.

Referring to FIG. 8, a cross-sectional view of the main body assembly 102, according to one embodiment is disclosed. The axle 110 is inserted into the central rotatable hub 104. In one embodiment, the axle shaft liner 118 extends along the central rotatable hub 104. The flange hex head sheet metal screw or sheet metal screw 122 secures the tie wrap 124 that is positioned under the flat washer or metal axle or a first flat washer 126. In one embodiment, the tie wrap 124 secures the first flat washer 126 under the central rotatable hub 104. In one embodiment, the flat washer 126 is configured to provide a flat surface for the plastic bearing or plastic flat washer 128 to rotate upon and it holds secure the weight of the central rotatable hub 104. In one embodiment, the plastic flat washer 128 provides a flat surface or slippery bearing surface between the flat washer 126 and the central rotatable hub 104.

In one embodiment, regular clear PVC cement is added when inserting the axle shaft liner 118 into the central rotatable hub 104 using a mallet. The regular clear PVC cement is added only on the outer diameter of the axle shaft liner 118. In one embodiment, the main body assembly 102 further comprises one or more wingspar shaft liners 134. The wingspar shaft liners 134 are positioned in the center of the central rotatable hub 104 using a mallet. In one embodiment, regular clear PVC cement is added when inserting the wingspar shaft liner 134 into the central rotatable hub 104. The regular clear PVC cement is added only on the outer diameter of the wingspar shaft liner 134. In one embodiment, the foam tape 132 is positioned over the pushrods 116 and configured to reduce the noise of the airfoil 108 striking the pushrod 116. In one embodiment, the foam tape 132 may be an adhesive black vinyl foam.

Figure 9:
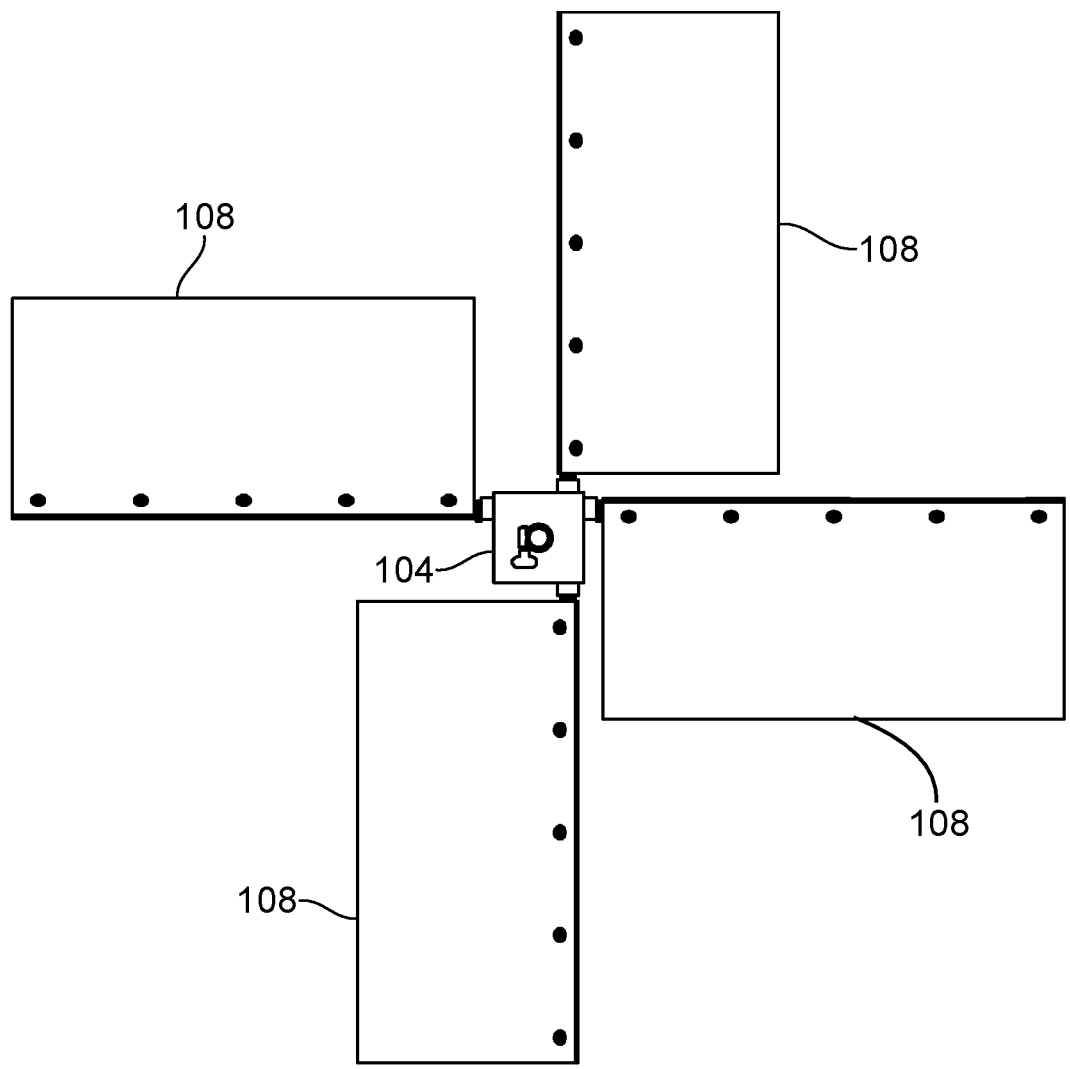
FIG. 9 exemplarily illustrates a top view of airfoil assembly, according to one embodiment of the present disclosure.
Figure 10:
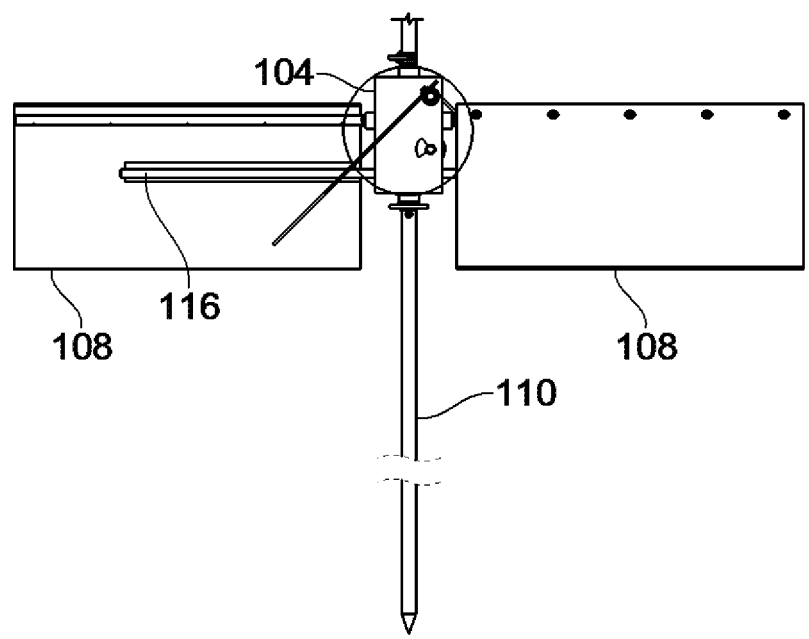
FIG. 10 exemplarily illustrates a front view of airfoil assembly, according to one embodiment of the present disclosure.

Referring to FIGS. 9-10, various perspective views of airfoils assembly, according to one embodiment are disclosed. The airfoils 108 are positioned using multiple wingspar 106. In one embodiment, each wingspar 106 is securely attached to two airfoils 108 as a single moving part, which then rotates within the slippery central rotatable hub 104. In one embodiment, each wingspar 106 is configured to push the central rotatable hub 104 simultaneously with the pushrods 116 in order to transfer the kinetic wind energy from each airfoil 108 to the central rotatable hub 104. Each wingspar 106 firmly holds the two airfoils 108 that is attached to it.

When each airfoil 108 connected to the wingspar 106 rotates, it is constrained by the pushrod 116 that is parallel to it, to rotate only 90 degrees back and forth. In one embodiment, the wingspars 106 rock back and forth to rotate vertically clockwise and counterclockwise, continuously while the airfoils 108 are pushed, and self-correct themselves as the wind blows, so energy can be generated from any movement when the pushrod 116 is hit by the airfoil 108. In one embodiment, each wingspar 106 connects the two airfoils 108, each on opposite sides of the central rotatable hub 104, together into a single moving part. In one embodiment, a minimum of two wingspar sets 106 are required to enable the turbine to rotate continuously. Further, there is no theoretical upper limit to the number of wingspars that can be utilized on a single axle for a single turbine.

Figure 11:
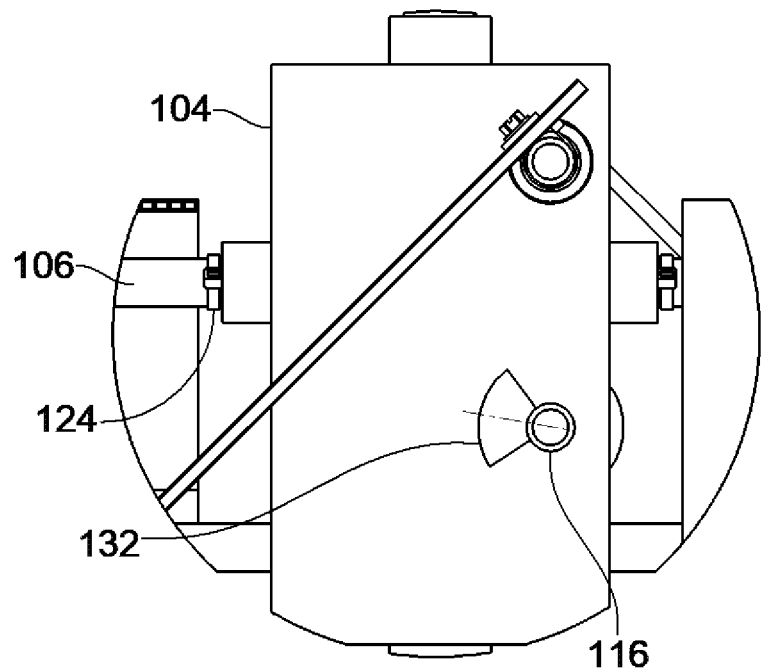
FIG. 11 exemplarily illustrates an enlarged view of the central rotatable hub with airfoil assembly, according to one embodiment of the present disclosure.

Referring to FIG. 11, an enlarged view of the central rotatable hub 104 with airfoil assembly, according to one embodiment is disclosed. In one embodiment, the airfoils 108 are positioned using the wingspars 106. The wingspars 106 are positioned using the tie wrap 124 that secures the wingspars 106 to the central rotatable hub 104. Further, the foam tape 132 is positioned over the pushrods 116 and configured to reduce the noise of the airfoil 108 striking the pushrod 116. In one embodiment, the foam tape 132 may be an adhesive black vinyl foam.

Figure 12:
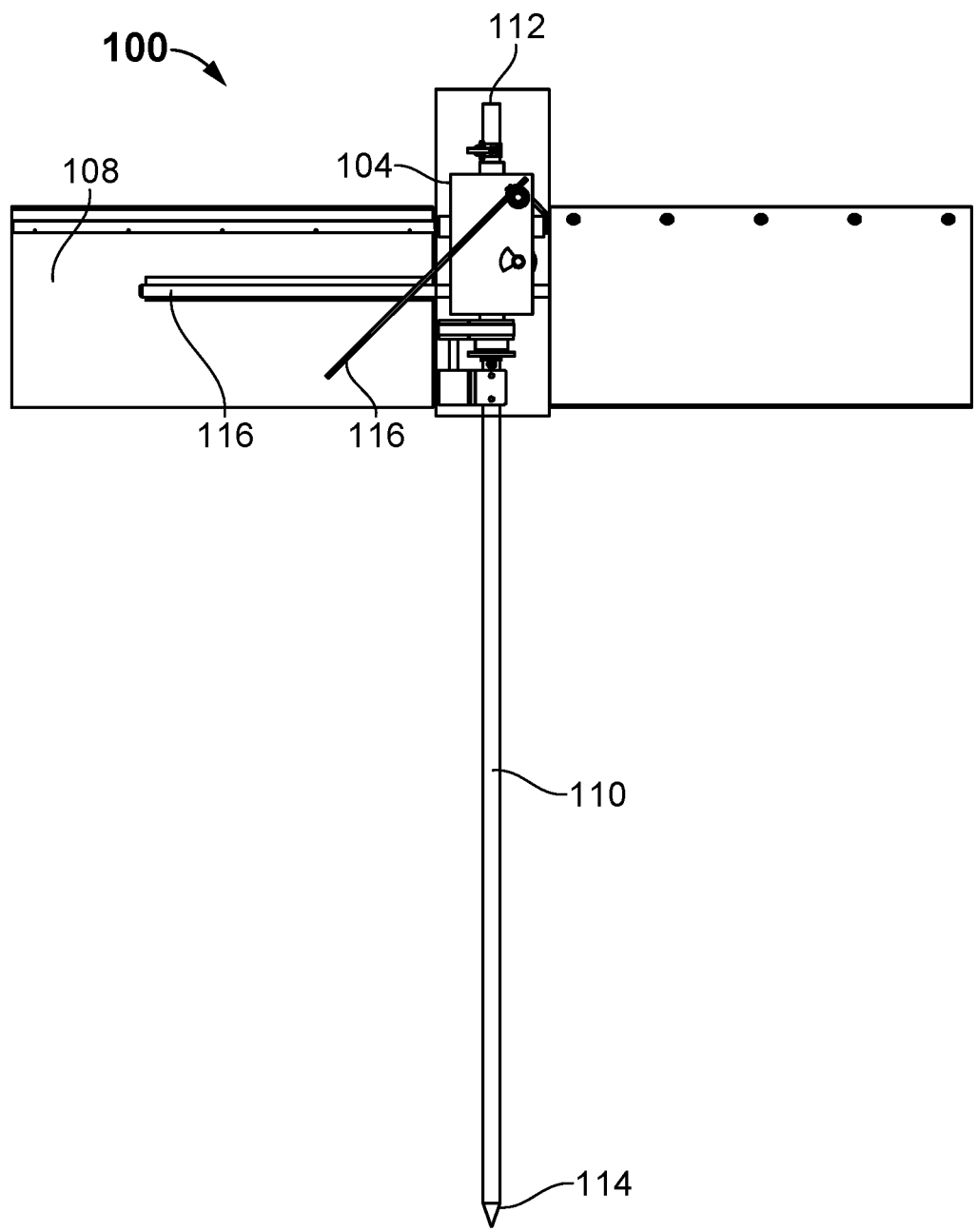
FIG. 12 exemplarily illustrates a front view of a vertical-axis wind turbine, according to another embodiment of the present disclosure.
Figure 13:
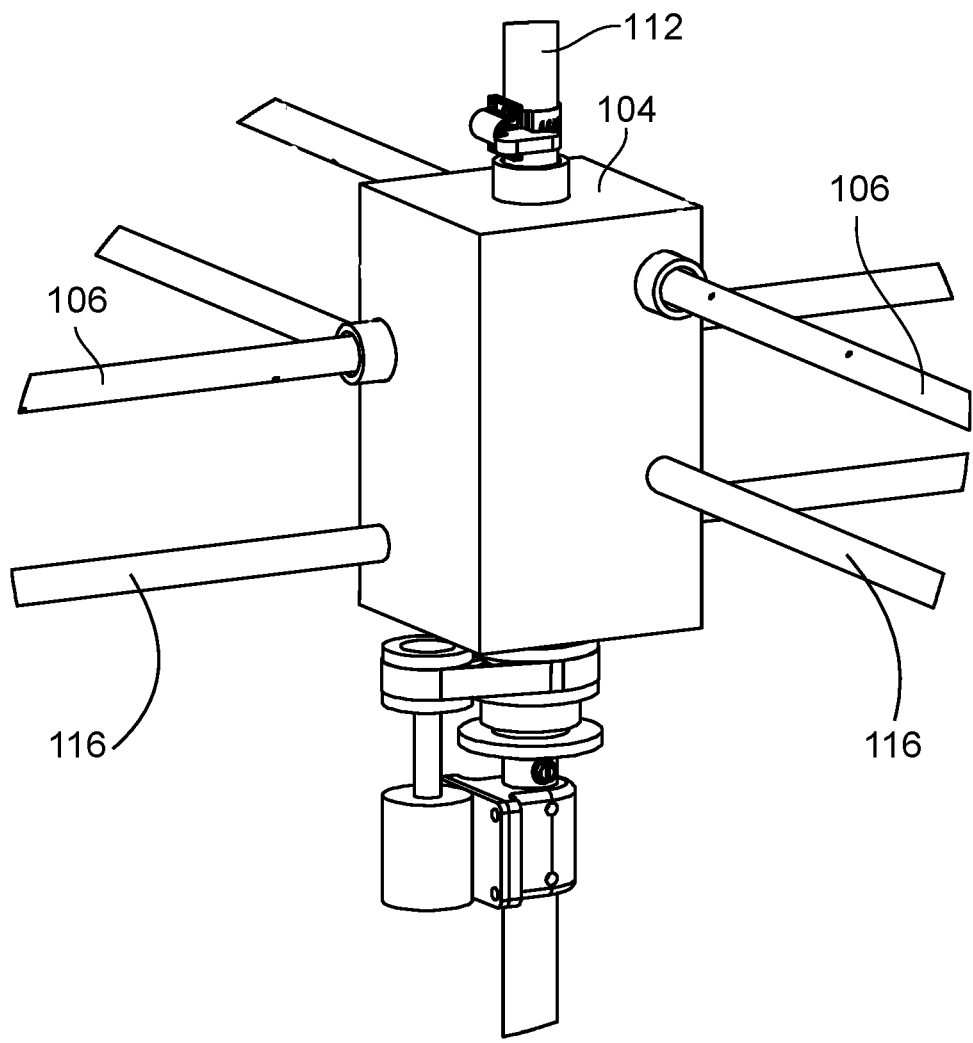
FIG. 13 exemplarily illustrates a perspective view of a central rotatable hub of the vertical axis wind turbine, according to another embodiment of the present disclosure.

Referring to FIGS. 12-13, various perspective views of the vertical-axis wind turbine 100, according to another embodiment are disclosed. In one embodiment, the vertical-axis wind turbine 100 comprises the central rotatable hub 104. The central rotatable hub 104 comprises a plurality of wingspars 106 configured to mount a plurality of airfoils 108. The central rotatable hub 104 comprises multiple rows of wingspars 106 configured to hold a plurality of pushrods 116 to position the airfoils 108. Each pushrod 116 is firmly and rigidly positioned via each wingspar 106 configured to convert a linear kinetic wind energy from the airfoils 108 to the pushrods 116 to the rotational energy of the central rotatable hub 104. In one embodiment, each airfoil 108 is oriented 90 degrees apart from each other. In one embodiment, the vertical-axis wind turbine 100 further comprises the axle or stationary axle shaft 110. The axle 110 has an upper 112 end and a lower end 114. In one embodiment, the central rotatable hub 104 is attached to the upper end 112 of the axle 110, whereas the lower end 114 is inserted into the base or any support structures.

Figure 15:
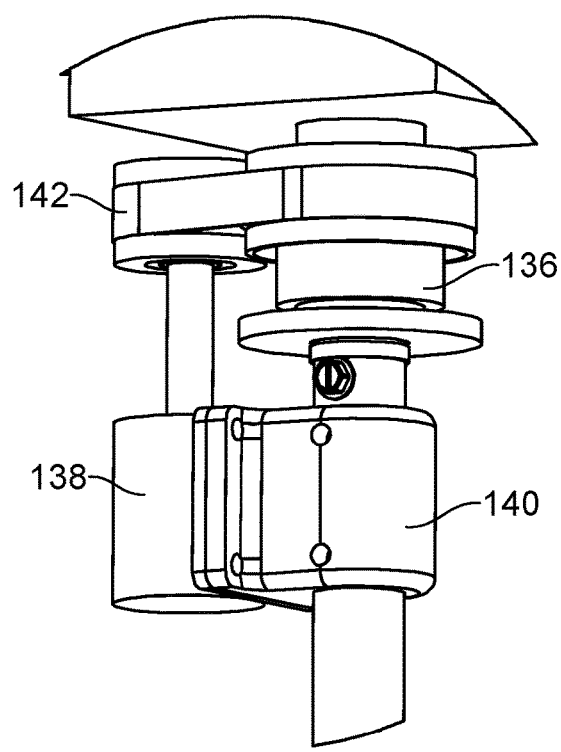
FIG. 15 exemplarily illustrates an enlarged view of the generator assembly, according to another embodiment of the present disclosure.

Referring to FIGS. 14-15, the central rotatable hub 104 with a generator assembly, according to another embodiment is disclosed. In one embodiment, the generator assembly is positioned at the lower end of the central rotatable hub 104. The generator assembly is secured to the axle 110 that passes through the central rotatable hub 104. In one embodiment, the generator assembly comprises at least one sheet metal screw 122 to secure the tie wrap 124 that is under the flat washer 128. In one embodiment, the generator assembly further comprises the second flat washer 130 is configured to secure the airfoil 108 to the wingspar 106.

Optionally, the generator assembly comprises a v-belt pulley 136, a generator 138, a generator mount 140, and a v-belt 142 configured to rotate the central rotatable axle 110. The v-belt pulley 136 is configured to transfer rotational energy from the central rotatable hub 104 to the v-belt 142. The generator 138 converts rotational energy extracted from the wind into electricity or pump pressure. The generator mount 140 secures the generator 138 to the axle 110. The v-belt 142 transfers rotation energy from the v-belt pulley 136 below the central rotatable hub 104 to the v-belt pulley 136 on the generator/pump 138.

Figure 16:
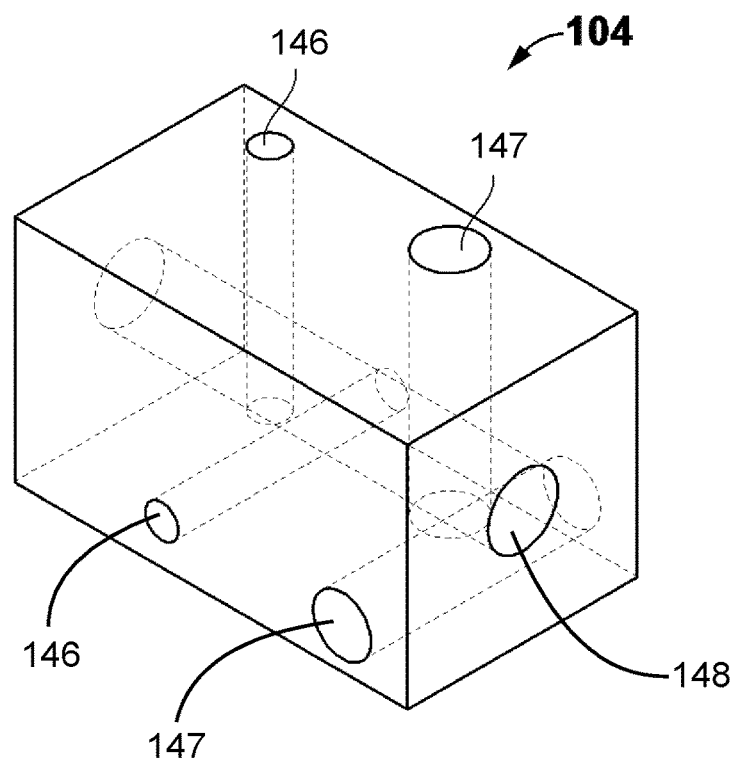
FIG. 16 exemplarily illustrates a see-through view of the central rotatable hub, according to one embodiment of the present disclosure.

Referring to FIG. 16, a see-through view of the central rotatable hub 104, according to one embodiment is disclosed. The central rotatable hub 104 comprises a through-hole 148 along its length to position the axle 110 and a series of alternatively positioned through holes 146-147 for positioning the wingspars 106 and the pushrods 116. The through-hole 148 for positioning the axle 110 has a dimension of about Ø1¹⁄₁₆" in diameter. The through holes, or wingspar holes 147, for positioning the wingspars 106 have a dimension of about Ø⅞" in diameter. Each pair of holes are positioned at about 2¾" from each other.

Figure 17:
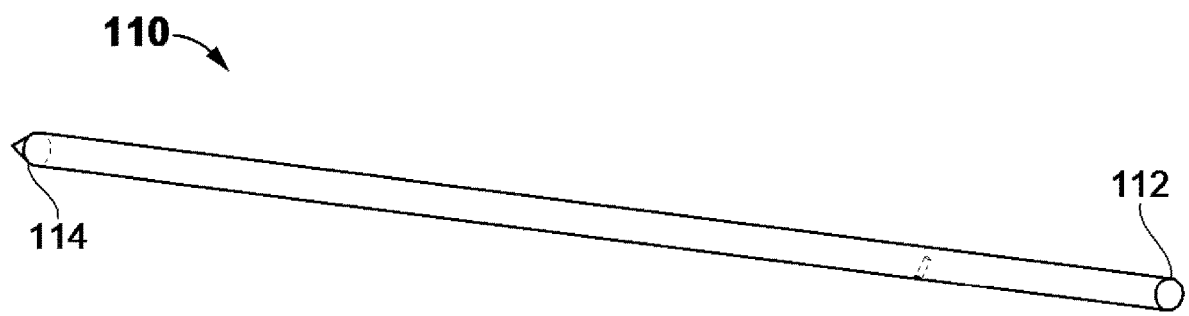
FIG. 17 exemplarily illustrates a perspective view of the axle, according to one embodiment of the present disclosure.

Referring to FIG. 17, a perspective view of the axle 110, according to one embodiment is disclosed. The axle 110 has an upper 112 end and a lower end 114. In one embodiment, the central rotatable hub 104 is attached to the upper end 112 of the axle 110, whereas the lower end 114 is inserted into a base. The lower end 114 is sharpened as needed. In one embodiment, the axle 110 has a dimension of about 48" in length and Ø¾" in diameter.

Figure 18:
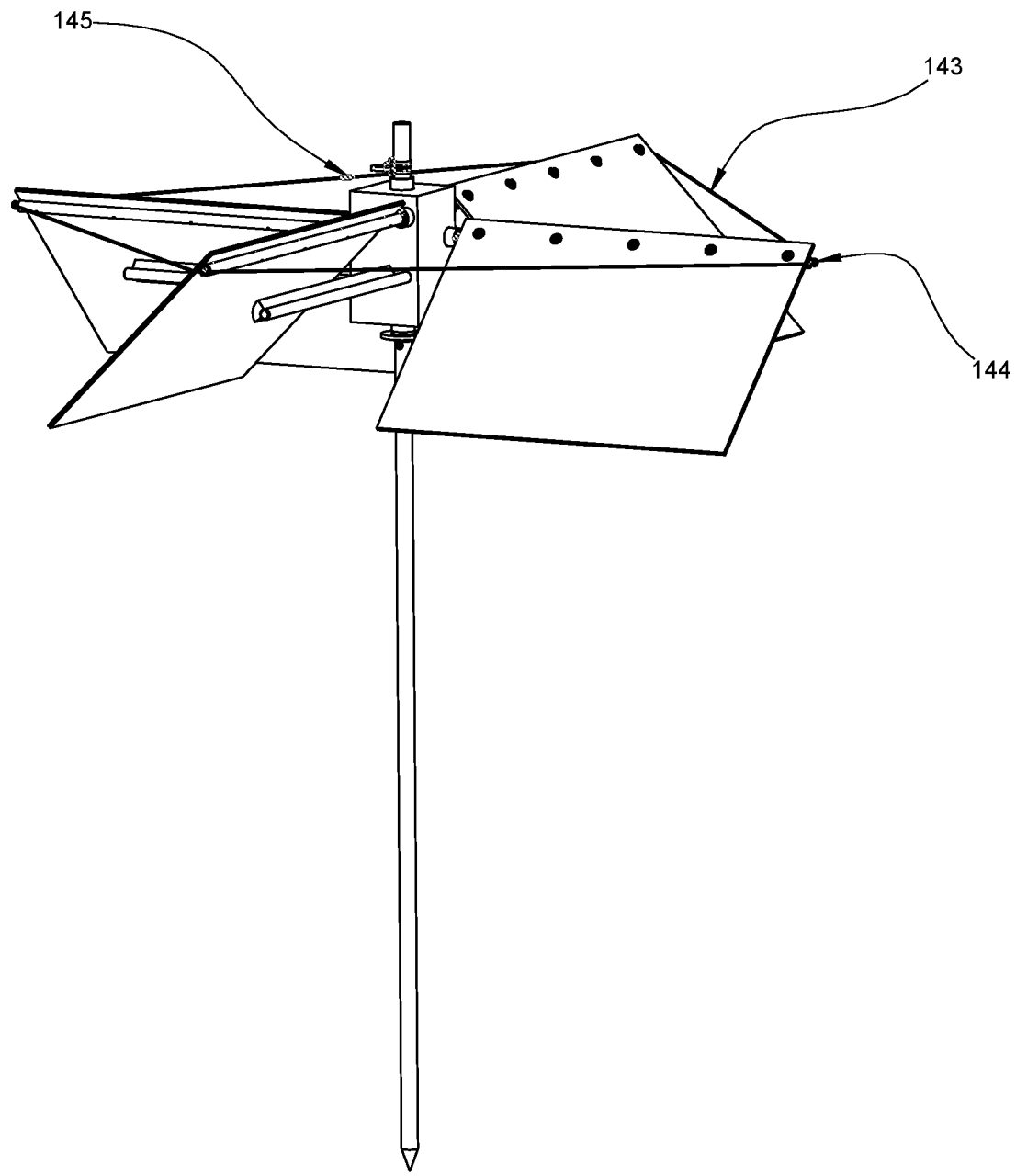
FIG. 18 exemplarily illustrates a perspective view of a vertical-axis wind turbine, according to an embodiment of the present disclosure.
Figure 19:
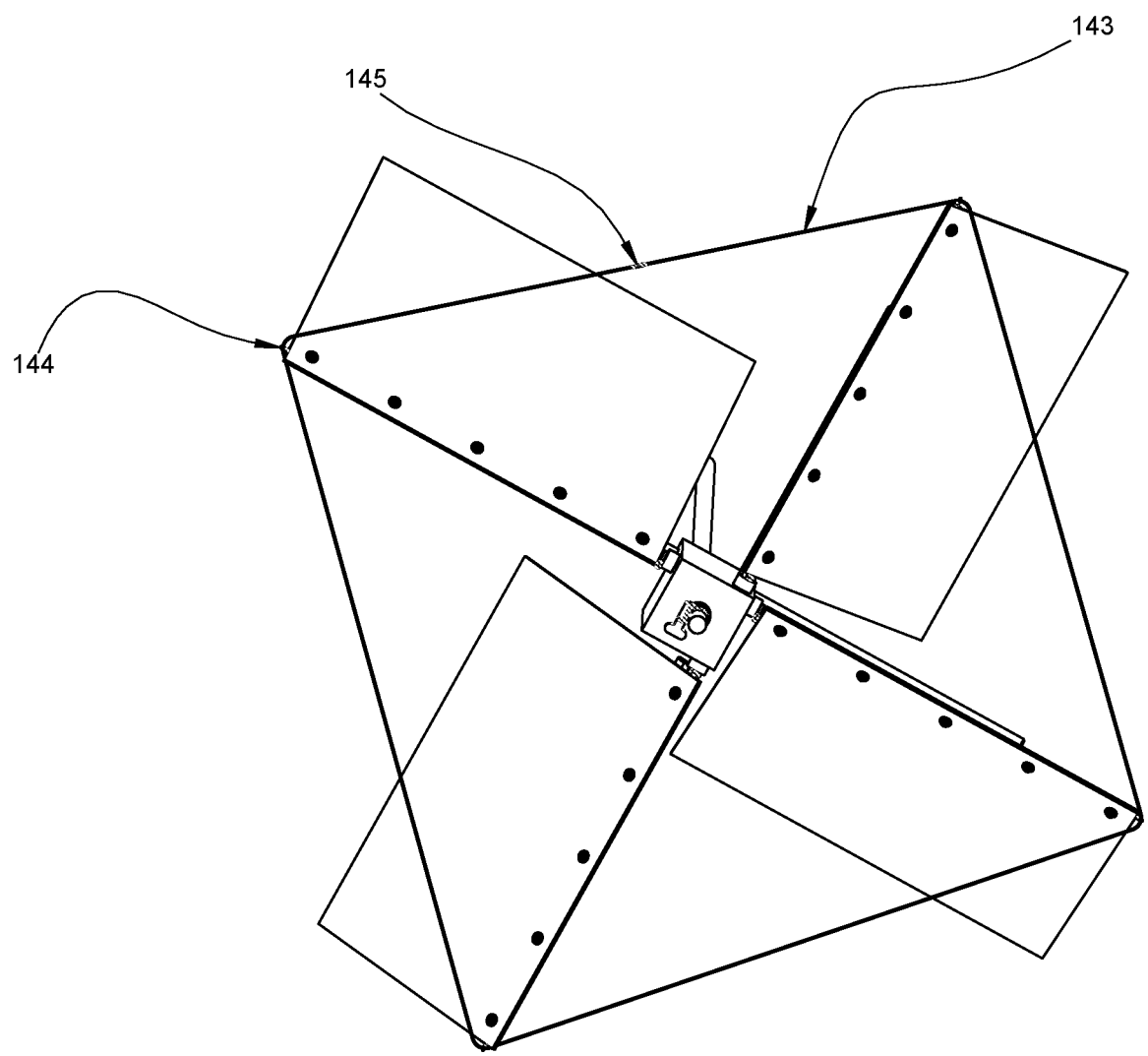
FIG. 19 exemplarily illustrates a top view of airfoil assembly, according to one embodiment of the present disclosure.

Referring to FIG. 18-19, side and top perspective views of the assembly with an option for hurricane durability 143 to 145, according to one embodiment is disclosed. The tips of the wingspars have a screw eye hook 144 fastened into their middle axes, through which a transparent line 143 is passed and then crimped 145. During episodes of high rising gusts, the rising airfoil beats against the line 143. This is sufficient to stop the overtravel of the airfoil past the 90 degrees of freedom, thereby eliminating the torsional stress twisting the wingspar when it is pushed up by a sudden random vertical storm gust. In one embodiment, four screw eye hooks 144 are embedded into each end of the four wingspars. Then a length of line 143 is loosely connected through them and crimped 145 to keep the line in place.

EXAMPLES

Win Turbine as a Platform for a Generator, Pump, or Gear Train:

The bottom or top of the central rotatable hub 104 provides surfaces suitable to accommodate rotor pulley or gearing. Above the central rotatable hub 104 or below the central rotatable hub 104 on the axle 110, the shaft will accommodate stator pulleys or gearing that can be attached to the axle 110. Rotors are mechanically engineered to hold a mechanism with a matching stator gearing or pulley.

Wind Turbine as a Message Sign:

As a rotating sign, the vertical-axis wind turbine displays 8 or more sign surfaces from four or more airfoils 108 visible from any one fixed viewer's perspective as seen from anywhere around the periphery of the turbine as it rotates. In the simplified vertical-axis wind turbine version shown, the user brings four parts to the worksite: two wingspar subassemblies 106, one central rotatable hub 104, and one axle 110. The installer hammers the axle's pointed tip into the ground or secures it into another holder. Then the assembler inserts the central rotatable hub 104 onto the assembly through the top of the axle 110 and fixes it on the axle 110 with a finger tightened hose clamp 120. The assembly becomes an eye-catcher with messages.

Wind Turbine as a Flagpole:

As a rotating flagpole, the simplified panemone in this application displays 4 flags. In the simplified panemone version shown, the user brings four parts to the worksite: two wingspar subassemblies with flags, one hub and one axle. The installer hammers the axle's pointed tip into the ground or secures it into another holder. Then the assembler inserts the hub onto the assembly through the top of the axle and fixes it on the axle with a finger tightened hose clamp. Finally, the installer slips the flagpole into a flag pole wall holder or ground anchor.

Wind Turbine as a Road Caution:

As a rotating sign, the wind turbine displays 8 or more sign surfaces with cautions or retroreflective flashers from four or more airfoils 108 visible from anyone fixed viewer's perspective placed anywhere around the periphery of the turbine 100. The installer can install the axle 110 on signposts with common mechanisms including screw-on hose brackets.

Wind Turbine as a Wind Indicator:

As a rotating highly visible anemometer, the wind turbine rotates in the presence of wind and proportionally to the airfoil speed. The simplified version shown is rated for constant use in up to 65 mph winds and gusts. The wind turbine can be mechanically engineered to meet hurricane-strength wind.

Wind Turbine in Various Sizes:

The size of the wind turbine 100 can be varied from a handheld unit with tiny airfoils under an inch, to using airfoils as large as a billboard with a corresponding larger hub and support system. The entire structure would need to be upgraded and rated for increased stress for larger airfoils 108. It is feasible to adapt the concept for use in water or other fluids having a greater density than air or for faster velocities. The basic concept of the invention can be upsized limited only by practicality and available materials strengths in the usage environments. The turbine 100 depicted in the prints may be sized and designed for use in air. It has withstood sustained winds of more than 65 miles per hour for more than 12 hours. The same concept can apply across many sizes.

The rotation force for different wind speeds and areas of wings is calculated using the following equation.

Equation for force $F = \frac{1}{2} rho \times V^2 \times A \times C$

TABLE 1

| Force | 1/2 | rho | V | V² | A | C |
|---|---|---|---|---|---|---|
| 300,00 | 0.5 | 0.075 | 100 | 10,000 | 800 | 1 |
| 75,000 | 0.5 | 0.075 | 50 | 2,500 | 800 | 1 |
| 12,000 | 0.5 | 0.075 | 20 | 400 | 800 | 1 |
| 3,000 | 0.5 | 0.075 | 10 | 100 | 800 | 1 |
| 750 | 0.5 | 0.075 | 10 | 100 | 200 | 1 |
| 188 | 0.5 | 0.075 | 10 | 100 | 50 | 1 |
| 3,000 | 0.5 | 0.075 | 10 | 100 | 800 | 1 |
| 47 | 0.5 | 0.075 | 10 | 100 | 13 | 1 |
| 11 | 0.5 | 0.075 | 10 | 100 | 3 | 1 |
| 6 | 0.5 | 0.075 | 10 | 100 | 2 | 1 |

The resultant rotation force (PSI) for different wind speeds and areas of the airfoil 108 is listed in the above table 1.

Advantageously, the vertical-axis wind turbine of the present disclosure has the ability to effectively capture the wind energy. The vertical-axis wind turbine may also move perpendicularly and freely with the wind in a more efficient manner. In addition, the vertical-axis wind turbine is a cost-effective, compact and smaller in size turbine that also does not pose a threat to wildlife. The vertical-axis wind turbine is a fluid turbine that captures fluid energy more efficiently than existing wind turbines, combined with the capability to automatically move perpendicular and freely with the wind and gusts without requiring a starting velocity. Further, the vertical-axis wind turbine provides cost-effective, aesthetically pleasing, up-sizable turbine made from commercially available parts and which does not pose a threat to wildlife.

The foregoing description comprise illustrative embodiments of the present disclosure. Having thus described exemplary embodiments of the present disclosure, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method.

Many modifications and other embodiments of the disclosure will come to mind to one skilled in the art to which this disclosure pertains having the benefit of the teachings presented in the foregoing descriptions. Although specific terms may be employed herein, they are used only in generic and descriptive sense and not for purposes of limitation. Accordingly, the present disclosure is not limited to the specific embodiments illustrated herein. While the above is a complete description of the preferred embodiments of the disclosure, various alternatives, modifications, and equivalents may be used. Therefore, the above description and the examples should not be taken as limiting the scope of the disclosure, which is defined by the appended claims.

The invention claimed is:

1. A vertical-axis wind turbine, comprising:
a central rotatable hub having multiple wingspar holes;
multiple wingspars, each wingspar extending completely through the central rotatable hub and comprising two airfoils;
multiple pushrods firmly and rigidly positioned parallel to each wingspar configured to convert a linear kinetic wind energy from the airfoils to the pushrods into rotational energy of the central rotatable hub, and
a stationary axle having an upper end extending above and attached to the central rotatable hub and a lower end extending below the central rotatable hub and inserted into a base, and
wherein at least two airfoils are mounted on each wingspar,
wherein, when a fluid force blows on the vertical-axis wind turbine, one airfoil of a given wingspar is blown against the respective parallel pushrod into the maximum angle of attack to perform work to be pushed by the wind and forced in a direction of the wind velocity, and the other airfoil of the given wingspar is blown away from the respective parallel pushrod and held into the minimum angle of attack, such that the wind energy is captured,
wherein one airfoil of a given wingspar is mechanically joined to the airfoil at the other end of the given wingspar, such that the central rotatable hub is turned in the same rotation direction irrespective of the direction of the wind.

2. The vertical-axis wind turbine of claim 1, wherein the central rotatable hub rotates freely around the axle.

3. The vertical-axis wind turbine of claim 1, wherein the central rotatable hub holds the wingspars loosely and allows them to rotate freely in the wingspar holes, respectively.

4. The vertical-axis wind turbine of claim 1, wherein each wingspar is rotationally constrained by one of the pushrods that is parallel thereto, such that rotation of each wingspar is limited to 90 degrees from its initial position.

5. The vertical-axis wind turbine of claim 1, wherein the multiple airfoils comprise a minimum of two sets, totaling four airfoils.

6. The vertical-axis wind turbine of claim 1, wherein each wingspar is configured to rotate in two directions around a longitudinal axis thereof, and the two airfoils of a given wingspar are disposed on opposite sides of the central rotatable hub.

7. The vertical-axis wind turbine of claim 1, wherein the two airfoils of a given wingspar are disposed on opposite sides of the central rotatable hub and are disposed at right angles to each other.

8. The vertical-axis wind turbine of claim 1, wherein during operation of the vertical-axis wind turbine each airfoil faces the fluid for maximum available drag when it is pushed back against the pushrod by the fluid at its maximum angle of attack.

9. The vertical-axis wind turbine of claim 1, wherein the axle is rigidly anchored onto one or more structures at its base.

10. The vertical-axis wind turbine of claim 1, wherein each pushrod provides a surface for a respective one of the airfoils to push on at its maximum angle of attack.

11. The vertical-axis wind turbine of claim 1, wherein during operation of the vertical-axis wind turbine, each pushrod stops a respective one of the airfoils from passing it when the airfoil experiences maximum drag.

12. The vertical-axis wind turbine of claim 1, wherein during operation of the vertical-axis wind turbine, the fluid force pushes each airfoil onto a respective one of the pushrods and drives the central rotatable hub to rotate until each airfoil is no longer forced onto the respective one of the pushrods.

13. The vertical-axis wind turbine of claim 1, wherein during operation of the vertical-axis wind turbine, at least one of the airfoils automatically presents a retreating face with maximum drag to the oncoming wind during the rotation of one end of a given wingspar from zero degrees to 180 degrees around a circumference of the stationary axle.

14. The vertical-axis wind turbine of claim 12, wherein during operation of the vertical-axis wind turbine, the wind withdraws the at least one of the airfoils from the drag when one end of a given wingspar proceeds from 180 degrees to 360 degrees of rotation around a circumference of the stationary axle.

15. The vertical-axis wind turbine of claim 1, wherein during operation of the vertical-axis wind turbine, one airfoil of a given wingspar rotates to be perpendicular to the fluid force for maximum energy capture and the other airfoil of the given wingspar rotates to be parallel to the fluid force,
wherein at which time another one of the airfoils rotates to be perpendicular to the fluid force thereby taking over energy capture.

16. The vertical-axis wind turbine of claim 1, wherein when no fluid force blows on the vertical-axis wind turbine, each pair of airfoils resets freely to a resting position.

* * * * *